Oct. 16, 1951          L. R. BEARD ET AL          2,571,654
       COMBINATION LINE SWITCH, STARTING SWITCH, AND
              OVERLOAD FOR ELECTRIC MOTORS
                  Filed Nov. 10, 1948
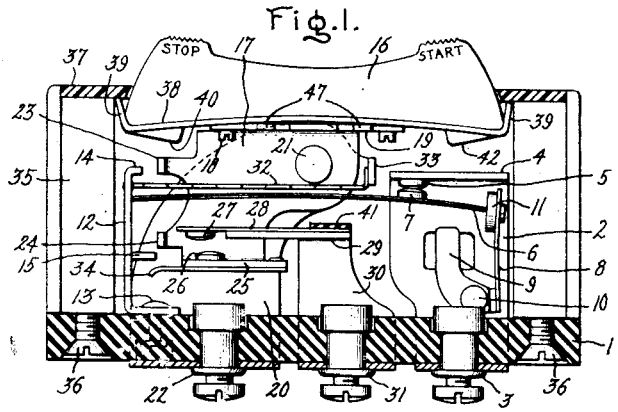
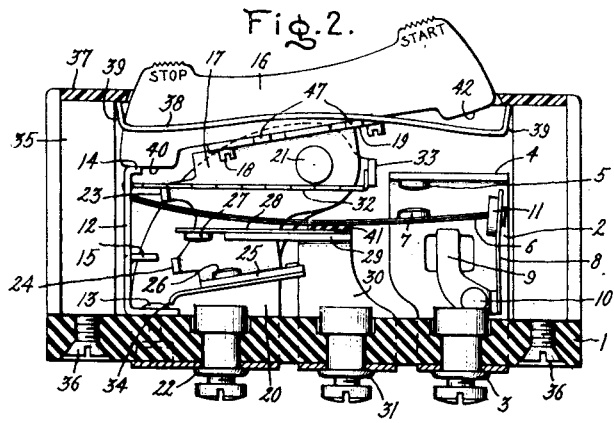
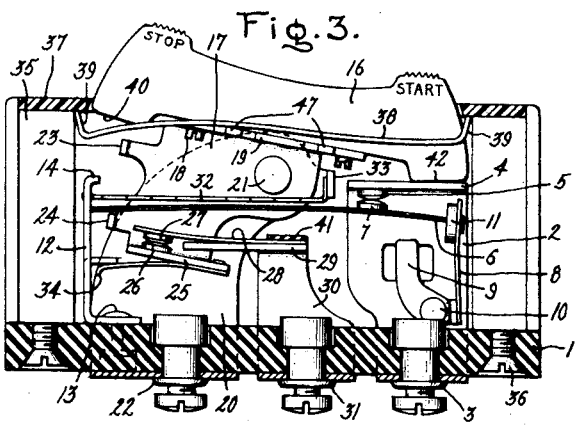
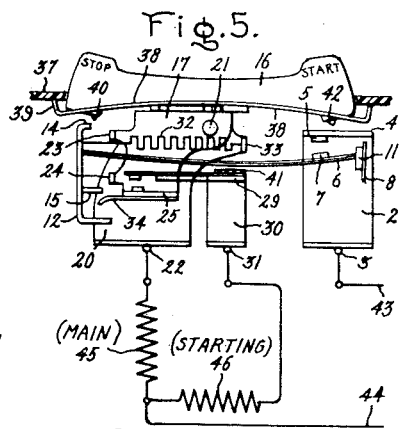
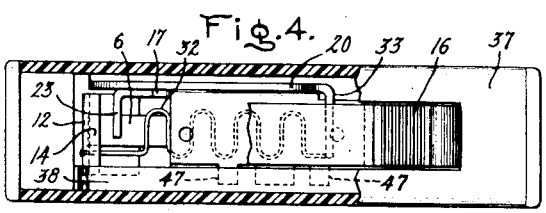
Inventors:
Lee R. Beard,
Richard E. Seely,
Gerald C. Holdgreve,
by  *Parvell & Mack*
      Their Attorney.

Patented Oct. 16, 1951

2,571,654

UNITED STATES PATENT OFFICE 2,571,654

COMBINATION LINE SWITCH, STARTING SWITCH, AND OVERLOAD FOR ELECTRIC MOTORS

Lee R. Beard, Richard E. Seely, and Gerald C. Holdgreve, Fort Wayne, Ind., assignors to General Electric Company, a corporation of New York Application November 10, 1948, Serial No. 59,332

5 Claims. (Cl. 200—122)

This invention relates to starting and overload protective devices for electric motors and more particularly to such devices for single phase alternating current motors.

It is well-known that single phase alternating current motors must be provided with means for initially producing a rotating field during starting. To accomplish this, in addition to the main or running field exciting winding, a starting winding is generally provided with the necessary phase split being secured either by the difference in resistance of the starting winding with respect to the running winding, or by the use of a capacitor in series with one of the windings. When the motor has come up to speed, the starting winding is usually disconnected so that the motor runs on the main winding only. This is generally accomplished, particularly in fractional horsepower motors, by the use of a centrifugal mechanism on the motor shaft which actuates a switch to open the circuit of the starting winding when the motor has come up to speed. It is frequently desirable that fractional horsepower motors also be provided with a line switch and with an overload protective device for stopping the motor when an overload occurs, either in starting or after the motor is in operation. These three elements, i. e. the centrifugal starting mechanism, line switch, and overload protective device are usually separate elements with the centrifugal starting mechanism in particular being complicated and expensive.

An object of this invention is to provide a simple device combining a line switch, overload protective device and starting switch for electric motors.

Another object of this invention is to provide a combination line switch, starting switch and overload protective device for single phase electric motors which obviates the necessity for a centrifugal starting mechanism.

Further objects and advantages of this invention will become apparent and the invention will be better understood by reference to the following description and the accompanying drawing. The features of novelty which characterize this invention will be pointed out with particularity in the claims annexed to and forming a part of this specification.

In accordance with this invention, there is provided a pair of line contacts adapted to be arranged in one of the energizing lines of the motor. One of the line contacts is mounted on a column type over-center bimetallic spring which is adapted to be connected in the energizing circuit of the motor. A manually operated lever or push-button mechanism is adapted to selectively deflect the spring into one over-center position to close the line contacts and start the motor and to deflect the spring into the other over-center position to open the line contacts and stop the motor. Since the load current flows through the bimetallic spring, excessive current caused by an overload on the motor deflects the spring into the other over-center position opening the line contacts and stopping the motor. A pair of starting contacts arranged in the circuit of the starting winding are provided with one starting contact being mounted on the manual spring deflecting mechanism. Thus, when the manual mechanism is depressed deflecting the spring to close the line contacts, the starting contacts are also closed. Another spring is provided to return the manual spring deflector to a neutral position when manual pressure is removed whereby the starting contacts are opened without opening the line contacts. An auxiliary heating resistor may be provided through which load current flows to assist the deflection of the bimetallic spring when an overload occurs after the starting cycle. Means may be provided on the starting contact mounted on the manual spring deflector to short-circuit the heating resistor when the starting contacts are closed.

In the drawing, Fig. 1 is a side elevation view, partly in section, illustrating the improved combination line switch, starting switch and overload of this invention with the line contacts closed; Fig. 2 illustrates the mechanism of Fig. 1 with the manual spring actuator depressed in the stop position to open the line contacts; Fig. 3 illustrates the mechanism of Fig. 1 with the manual actuator depressed in the start position closing the line and starting contacts and short-circuiting the auxiliary heating resistor; Fig. 4 is a vertical view, partly in section, of the mechanism of Fig. 1; and Fig. 5 is a schematic illustration illustrating the mechanism of Fig. 1 with the line contacts opened after either a manual stop or an overload opening and with the device connected to the windings of a single phase alternating current motor.

Referring now to Fig. 1, there is shown a stationary base member 1 formed of insulating material. Support member 2 of conductive material is secured to the base member 1 by a terminal insert 3. The support member 2 is bent at right angles at its upper extremity forming a stop portion 4 and a line contact 5 is mounted on the lower side of the stop portion 4 of the support member 2. A column type over-center bimetallic spring 6 is provided and a second line contact 7 is mounted on one end thereof. The bimetallic spring 6 is supported at one end by a flexible spring member 8 secured to a lever member 9. The lever member is in turn secured to the supporting member 2 by a rivet 10. The bimetallic spring 6 is insulated from the supporting spring 8 and the supporting member 2 by a grommet 11 formed of insulating material. The other end of the bimetallic spring 6 is supported by a supporting member 12 formed of conductive material, which is secured to the base member 1 in any suitable manner, as by a rivet 13. The spring supporting member 12 has its upper end formed at right angles to provide a stop portion 14 and another portion 15 is deflected therefrom for a purpose to be hereinafter described.

The bimetallic spring 6 is manually deflected into the upper over-center position (shown here in Fig. 1) to close the line contacts 5 and 7 by a manually operated actuator member 16. A deflector plate 17 formed of conductive material, is secured to the actuator member 16 in any suitable manner, as by the screws 18 through a flange portion 19 which abuts the lower surface of the actuator member 16. The deflector plate 17 is rotatably mounted on a support member 20 formed of conductive material, in any suitable manner, as by a rivet 21 and the supporting member 20 is in turn secured to the base member 1 by a terminal insert 22. The deflector plate 17 is provided with an upper spring deflecting portion 23 and a lower spring deflecting portion 24. The lower end of the deflector plate 17 is formed as a flanged portion 25 on which a starting contact 26 is mounted. Another starting contact 27 is mounted on a flat spring member 28 which in turn is secured to a flanged portion 29 of a supporting member 30, formed of conductive material. The supporting member 30 is secured to the base member 1 by a terminal insert 31. A flat accordion resistance heater member 32 is secured at one end to the spring supporting member 12 and at the other end to a flanged portion 33 of the supporting member 20. A short-circuiting spring 34 is secured to the lower side of the flange portion 25 of the deflector plate 17. A cover member formed of end portions 35 and encasing portion 37 is secured to the base member 1 by screws 36 and serves to enclose the device. A spring member 38 engages projections 47 on the upper surface of the flange portion 19 of the deflector plate 17 and is provided with ends 39 which engage the casing member 37. The deflection of the bimetallic spring 6 is adjusted by the lever 9 which is pivotally mounted on the supporting member 2 by the rivet 10.

Referring now to Fig. 2, the device of Fig. 1 is shown with the manual actuator member 16 depressed in the stop position. Here, the lower edge 40 engages the stop portion 14 of the supporting member 12 and the upper deflector portion 23 of the deflector plate 17 is engaging the bimetallic spring 6 deflecting it into the lower over-center position with the line contacts 5 and 7 open. A thin sheet of insulating material 41 is provided to prevent the bimetallic spring 6 from contacting the spring member 28. It can be easily seen that the projections 47 of the flange portion 19 of the deflector plate 17 have deflected the spring 38 upward so that when the pressure on the "stop" side of the manual actuator member 16 is removed, the deflector member 16 is returned to the neutral position shown in Fig. 1. However, when the manual actuator member 16 returns to the neutral position, the bimetallic spring 6 remains in the lower over-center position with the line contacts 5 and 7 open.

Referring now to Fig. 3, the device is shown with the manual actuator member depressed in the start position with the surface 42 engaging the stop 4 of the supporting member 2. Here, the lower deflecting portion 24 of the deflecting plate 17 engages the bimetallic spring 6 and deflects it into the upper over-center position to close the line contacts 5 and 7. In this position, the starting contacts 26 and 27 are closed and the short-circuiting spring 34 contacts the portion 15 of the supporting member 12 to short-circuit the heater resistor 32. When manual pressure on the start end of the manual actuator member 16 is released, the spring 38 causes the manual actuator member 16 to return to the neutral position, as shown in Fig. 1, with the starting contacts 26 and 27 open and heating resistor 32 no longer short-circuited by the short-circuiting spring 34. However, the bimetallic spring 6 remains in the upper over-center position with the line contacts 5 and 7 closed.

The operation of the combination line switch, starting switch and overload of this invention can best be described by reference to Fig. 5. The terminal 3 is connected to one energizing line 43 of the motor thus connecting the line contact 5 to the energizing line 43. When the start end of the manual actuating member 16 is depressed, the lower deflecting portion 24 of the deflecting plate 17 is raised deflecting the bimetallic spring 6 into the upper over-center position closing the line contacts 5 and 7. The start contacts 26 and 27 are also closed, preferably before the line contacts. The terminal 22 is connected to the main running winding 45 of the motor and the terminal 31 is connected to the starting winding 46. Since the short-circuiting spring 34 is contacting the portion 15 of the supporting member 12 thus short-circuiting the heater resistor 32, the circuit is from the energizing line 43 through the line contacts 5 and 7, the bimetallic spring 6, the supporting member 12, the portion 15 of the supporting member 12, and the short-circuiting spring 34. A portion of the current then flows through the deflector plate 17, the rivet 21, and the supporting member 20 to the main winding 45. Another portion of the current flows from the short-circuiting spring 34 through the starting contacts 26 and 27, the supporting member 30 and the terminal 31 to the starting winding 46. The other ends of the main winding 45 and starting winding 46 are connected to the other motor energizing line 44. Thus, with the start end of the manual actuating member 16 depressed, both the main winding 45 and the starting winding 46 are energized. When the manual pressure on the start end of the manual actuating member 16 is released, the manual actuator member 16 is returned to its neutral position by the spring 38 thus opening the starting contacts 26 and 27 and removing the short-circuit from the heating resistor 32. The circuit is now from the line 43 through the terminal 3, supporting member 2, line contacts 5 and 7, the bimetallic spring 6, supporting member 12, heater resistor 32, supporting member 20, and terminal 22 to the main winding 45. Thus, the starting contacts 26 and 27 have been opened, opening the circuit of the starting winding 46 and the main winding 45 is the only winding energized. In the case of an initial overload at starting, the continual high starting current flowing through the bimetallic spring 6 will cause it to deflect opening the line contacts 5 and 7 thus stopping the motor. After the pressure on the starting end of the manual actuator member 16 has been released and the starting contacts 26 and 27 opened, an overload does not produce the same high value of current and additional means may be needed to produce the required deflection of the bimetallic spring 6 to open the line contacts 5 and 7. Since, in the running position, the line current flows through the heater resistor 32, a flow of excessive current through the resistor provides sufficient heat to assist the deflection of the bimetallic spring 6 to open the line contacts 5 and 7. The motor is manually stopped by depressing the stop end of the manual actuator member 16 which causes the deflecting portion 23 of the deflecting plate 17 to deflect the bimetallic spring 6 into the lower over-center position, thus opening the line contacts 5 and 7.

It has been found that the ordinary duration of manual pressure exerted on the start end of the manual actuator member 16 is sufficient to bring a fractional horsepower motor up to speed and when this pressure is released, the motor has reached the proper state to operate on the main winding 45 alone. In the case of an overload either in starting or running which causes the bimetallic spring 6 to deflect opening the line contacts, the motor can be again started, after the bimetallic spring 6 has cooled, by again depressing the start end of the manual deflecting member 16. It has been found desirable in this device to arrange the sequence of closing of the starting and line contacts so that the starting contacts 26 and 27 close before sufficient pressure has been applied on the bimetallic spring 6 by the deflecting portion 24 to cause the spring to deflect it into the upper over-center position to close the line contacts 5 and 7. If the start end of the manual actuator member 16 is depressed an excessive length of time and the starting contacts 26 and 27 not opened, the heavy starting current flow will deflect the bimetallic spring 6 into the lower over-center position opening the line contacts 5 and 7 to prevent the starting winding 46 from over heating. Likewise, if the motor fails to start, or the rotor becomes locked during running, the bimetallic spring 6 would deflect into the lower over-center position opening the line contacts 5 and 7 to protect the windings. While the device is shown here with the heating resistor 32, it will be readily apparent that the heater may not be necessary for satisfactory operation. In this event, supporting members 12 and 20 may be integral instead of separate and insulated from each other as shown in the drawing.

It will be readily apparent that the combination line switch, starting switch and overload device of this invention by eliminating the necessity for a centrifugal mechanism and switch, and combining its function together with overload protection and a line switch, greatly reduces the cost of fractional horsepower motors. This device can be located either on the motor itself, or at any distance therefrom since it may be connected to the motor terminals by a three conductor wire. Thus, this device has utility in starting motors on washing machines, ironers, machine tools, etc., where a push-button type starting switch is needed together with overload protection and where low over-all cost is an important factor.

While there is illustrated and described a specific embodiment of this invention, further modifications and improvements will occur to those skilled in the art. We desire that it be understood, therefore, that this invention is not limited to the specific embodiment shown and we intend in the appended claims to cover all modifications within the spirit and scope of this invention.

What we claim as new and desire to secure by Letters Patent of the United States is:

1. A line switch, starting switch, and overload protective device for use with single-phase electric motors comprising, a pair of line contacts, a column type over-center bimetallic spring, one of said line contacts being mounted on said spring, manually operated means for selectively deflecting said spring into one over-center position to close said line contacts and for deflecting said spring into another over-center position to open said line contacts, said spring being adapted to be connected in a load circuit whereby excessive load current causes said spring to deflect into said other over-center position to open said line contacts, another pair of contacts, one of said other contacts being actuated by said manual deflecting means whereby said other contacts are closed when said manual deflecting means is operated to close said line contacts, and means for returning said manual deflecting means to a neutral position when said manual pressure is removed whereby said other contacts are opened.

2. A line switch, starting switch, and overload protective device for use with single-phase electric motors comprising, a pair of line contacts, a column type over-center bimetallic spring, one of said line contacts being mounted at one end of said spring, manually operated means for selectively deflecting said spring into one over-center position to close said line contacts and for deflecting said spring into another over-center position to open said line contacts, the other end of said spring being adapted to be connected in a load circuit whereby excessive load current causes said spring to deflect into said other over-center position to open said line contacts, another pair of contacts, one of said other contacts being mounted on said manual deflecting means whereby said other contacts are closed when said manual deflecting means is operated to close said line contacts, and means for returning said manual deflecting means to a neutral position whereby said other contacts are opened without opening said line contacts.

3. A line switch, starting switch, and overload protective device for use with single-phase electric motors comprising, a pair of line contacts, a column type over-center bimetallic spring, one of said line contacts being mounted on said spring, manually operated means for selectively deflecting said spring into one over-center position to close said line contacts and for deflecting said spring into another over-center position to open said line contacts, said spring being adapted to be connected in a load circuit whereby excessive load current causes said spring to deflect into said other over-center position to open said line contacts, another pair of contacts, one of said other contacts being actuated by said manual deflecting means whereby said other contacts are closed when said manual deflecting means is operated to close said line contacts, a heating element associated with said spring for assisting deflection of said spring, and means for rendering said heater ineffective when said other contacts are closed.

4. A line switch, starting switch, and overload protective device for use with single-phase electric motors comprising, a pair of line contacts, a column type over-center bimetallic spring, one of said line contacts being mounted on said spring, manually operated means for selectively deflecting said spring into one over-center position to close said line contacts and for deflecting said spring into another over-center position to open said line contacts, said spring being adapted to be connected in a load circuit whereby excessive load current causes said spring to deflect into said other over-center position to open said line contacts, another pair of contacts, one of said other contacts being actuated by said manual deflecting means whereby said other contacts are closed when said manual deflecting means is operated to close said line contacts, a heating resistor associated with said spring for assisting deflection of said spring, and means on said manual deflecting means for short-circuiting said resistor when said other contacts are closed.

5. A line switch, starting switch, and overload protective device for use with single-phase electric motors comprising, a pair of line contacts, a column type over-center bimetallic spring, one of said line contacts being mounted on said spring, manually operated means for selectively deflecting said spring into one over-center position to close said line contacts and for deflecting said spring into another over-center position to open said line contacts, said spring being adapted to be connected in a load circuit whereby excessive load current causes such spring to deflect into said other over-center position to open said line contacts, another pair of contacts, one of said other contacts being actuated by said manual deflecting means whereby said other contacts are closed when said manual deflecting means is operated to close said line contacts, means for returning said manual deflecting means to a neutral position whereby said other contacts are opened without opening said line contacts, a heating resistor associated with said spring and in series therewith for assisting deflection of said spring, and means on said manual deflecting means for short-circuiting said resistor when said other contacts are closed.

LEE R. BEARD.
RICHARD E. SEELY.
GERALD C. HOLDGREVE.

REFERENCES CITED

The following references are of record in the file of this patent:

UNITED STATES PATENTS

| Number | Name | Date |
|---|---|---|
| 1,565,546 | Burke | Dec. 15, 1925 |
| 1,565,638 | Goldrick | Dec. 15, 1925 |
| 2,379,602 | Stickel | July 3, 1945 |
| 2,462,244 | Wise | Feb. 22, 1949 |